US008880270B1

(12) United States Patent
Ferguson et al.

(10) Patent No.: US 8,880,270 B1
(45) Date of Patent: Nov. 4, 2014

(54) LOCATION-AWARE NOTIFICATIONS AND APPLICATIONS FOR AUTONOMOUS VEHICLES

(71) Applicant: Google Inc., Mountain View, CA (US)

(72) Inventors: Dave Ferguson, San Francisco, CA (US); Jiajun Zhu, Sunnyvale, CA (US); Manuel Christian Clement, Felton, CA (US)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 13/736,937

(22) Filed: Jan. 8, 2013

(51) Int. Cl.
*G01C 21/00* (2006.01)
*G05D 1/02* (2006.01)

(52) U.S. Cl.
CPC ................................. *G05D 1/0212* (2013.01)
USPC ................................. 701/23; 701/516; 705/6

(58) Field of Classification Search
USPC ............... 701/23, 25–26, 400, 410–412, 516, 701/533; 340/988, 995.27; 705/6, 7.15, 705/7.16
See application file for complete search history.

(56) References Cited

U.S. PATENT DOCUMENTS

| 5,774,069 | A | 6/1998 | Tanaka et al. |
| 8,024,112 | B2* | 9/2011 | Krumm et al. ................ 701/423 |
| 8,155,880 | B2 | 4/2012 | Patel et al. |
| 8,285,571 | B2* | 10/2012 | Demirdjian et al. ............. 705/6 |
| 8,392,110 | B2* | 3/2013 | Schunder ....................... 701/409 |
| 2004/0236504 | A1 | 11/2004 | Bickford et al. |
| 2011/0084851 | A1 | 4/2011 | Peterson et al. |

OTHER PUBLICATIONS

D. Lavrinc, "Daily Deals Are Coming to Your Car", Wired Autopia, Aug. 8, 2012, Wired.com / Conde Nast.

* cited by examiner

*Primary Examiner* — Yonel Beaulieu
(74) *Attorney, Agent, or Firm* — McDonnell Boehnen Hulbert & Berghoff LLP

(57) ABSTRACT

Methods and apparatus are disclosed related to autonomous vehicle applications for selecting destinations. A control system of an autonomous vehicle can determine a status of the autonomous vehicle. The control system can determine a possible destination of the autonomous vehicle. The control system can generate and provide a hint related to the possible destination based on the status of the autonomous vehicle. The control system can receive input related to the hint. Based on the input, the control system can determine whether to navigate the autonomous vehicle to the possible destination. After determining to navigate the autonomous vehicle to the possible destination, the control system can direct the autonomous vehicle to travel to the possible destination.

21 Claims, 6 Drawing Sheets

LOCATION-AWARE NOTIFICATIONS AND APPLICATIONS FOR AUTONOMOUS VEHICLES

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such an autonomous vehicle typically includes one or more sensors that are configured to sense information about the environment. The autonomous vehicle can use the sensed information to navigate through the environment. For example, if the sensors sense that the autonomous vehicle is approaching an obstacle, the vehicle can navigate around the obstacle.

While traveling in a non-autonomous vehicle, the driver of the non-autonomous vehicle may be the only occupant of the vehicle. Typically, driving a vehicle takes the largest share of the driver's attention, with only a small amount left over for other tasks, such as navigating the vehicle.

SUMMARY

In a first aspect, a control system for an autonomous vehicle is provided. The control system includes a processor and a non-transitory computer readable medium. The non-transitory computer readable medium has instructions stored thereon that, when executed by the processor, cause the control system to perform operations. The operations include: (a) determining a status of the autonomous vehicle, (b) determining a possible destination for the autonomous vehicle, (c) generating a hint related to the possible destination based on the status of the autonomous vehicle, (d) causing the hint to be provided through a user interface, (e) receiving input related to the hint, (f) based on the input, determining whether to navigate the autonomous vehicle to the possible destination, and (g) after determining to navigate the autonomous vehicle to the possible destination, directing the autonomous vehicle to travel to the possible destination.

In another aspect, an article of manufacture is provided. The article of manufacture includes a computer-readable storage medium having stored thereon program instructions that, upon execution by a computing device, cause the computing device to perform operations. The operations include: (a) determining a status of an autonomous vehicle, (b) determining a possible destination for the autonomous vehicle, (c) generating a hint related to the possible destination based on the status of the autonomous vehicle, (d) sending the hint, (e) receiving input related to the hint, (f) based on the input, determining whether to navigate the autonomous vehicle to the possible destination, and (g) after determining to navigate the autonomous vehicle to the possible destination, directing the autonomous vehicle to travel to the possible destination.

In yet another aspect, a method is provided. A status of an autonomous vehicle is determined. A possible destination of the autonomous vehicle is determined. A hint related to the possible destination based on the status of the autonomous vehicle is generated. The hint is provided. Input related to the hint is received. Based on the input, it is determined whether to navigate the autonomous vehicle to the possible destination. After determining to navigate the autonomous vehicle to the possible destination, the autonomous vehicle is directed to travel to the possible destination.

The foregoing summary is illustrative only and is not intended to be in any way limiting. In addition to the illustrative aspects, appearances, embodiments, and features described above, further aspects, appearances, embodiments, and features will become apparent by reference to the figures and the following detailed description.

DETAILED DESCRIPTION

Overview

Figure 1:
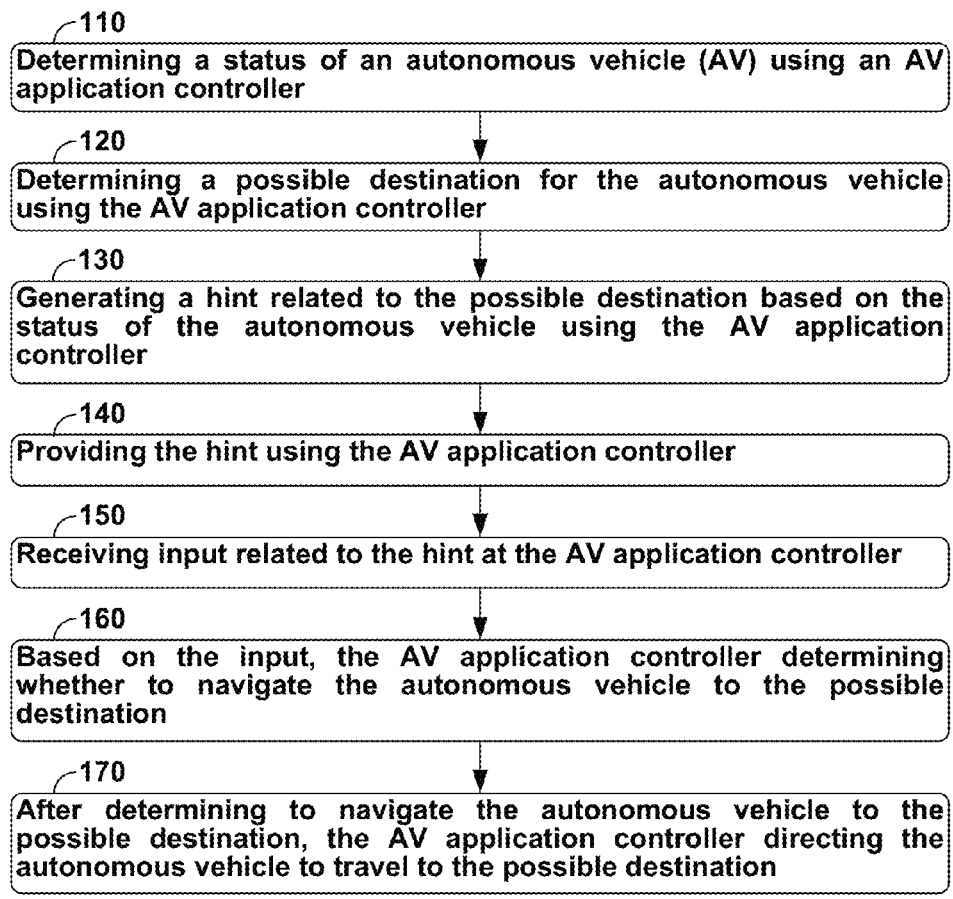
FIG. 1 is a flow chart of an example method, according to an example embodiment.

Several applications are disclosed that direct the autonomous vehicle and/or inform its passengers about possible destination selected based on the location of the autonomous vehicle, the status of the autonomous vehicle, and/or information about the autonomous vehicle's passengers. These applications can enable the autonomous vehicle to select destinations, and in combination with the autonomous vehicle's navigational and driving processes, can free the passengers from the tasks of driving and navigation.

In situations in which the systems and applications discussed herein collect personal information about users, or may make use of personal information, the users can be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server and/or application.

An example application involves informing passengers about upcoming points of interest, including location and other factors, such as the status of the autonomous vehicle and information about the current and past journeys taken using the autonomous vehicle. For example, the autonomous vehicle can inform passengers about nearby and/or on-the-way restaurants after (a) the current time between stops exceeds an average time between stops, suggesting the passengers may be hungry, (b) knowledge of restaurants previously visited by the vehicle's passengers, and (c) the proximity of a restaurant, or branch of a chain restaurant, that was previously visited by the passengers.

As another example, if the autonomous vehicle determines that the autonomous vehicle's status requires a stop; e.g., the autonomous vehicle is low on fuel/power or sensors in the autonomous vehicle indicate that service may be required, then the autonomous vehicle can inform the passengers that a stop is required to address the issues that require a stop; e.g., a stop to obtain fuel/power or a stop to diagnose and/or repair the autonomous vehicle. In some embodiments, the autonomous vehicle can direct itself to make a stop to address these issues, such as autonomous vehicle autonomously taking a detour to a gas station when the autonomous vehicle's fuel level is below a threshold.

Another application is a meetup application, where the autonomous vehicle can verify that one or more autonomous vehicle passengers and one or persons of interest have both authorized the application to access information related to activities, determine "meetup locations" of these activities, and generate one or more hint(s) about the meetup location(s). Based on this information, the hint(s) can inform the passenger(s) about meetup location(s) and offer to take the passenger(s) to a meetup location. For example, suppose an autonomous vehicle AV1 is carrying three passengers: P1, P2, and P3, who have three common friends, F1, F2, and F3. As P1, P2, and P3 enter the car, they each authorize AV1 to run the meetup application in AV1 is not already so authorized, and each in turn is authorize the meetup application to review information, such as messaging information, related to P1, P2, and P3. AV1 can then examine the authorized information about P1, P2, and P3 to find meetup location(s) of persons/people known to some or all of P1, P2, and P3.

As a result of this message search, AV1 may find that F1, F2, and F3 have told P1, P2, and P3 that they are planning to travel to a local park for a free concert. AV1 can then inform P1, P2, and P3 about the concert that F1, F2, and F3 plan to attend and ask the passengers about if they are interested in the concert as well. Specifically, AV1 can ask P1, P2, and P3 if they need more information before deciding whether to go to the park; e.g., information about the concert, park, other friends, other events happening at the same time, and/or other disclosed plans of F1, F2, and/or F3. In this example, P1, P2, and P3 decide to go to the concert in the park and can instruct AV1 to drive them to the park.

Another application is a "Day Trip" application, where an autonomous vehicle can examine information related to the passenger(s) to find location(s) of possible short (or long) trips for the passenger(s). If so authorized by the passenger(s), the Day Trip application can examine calendar and/or other messages related to the passenger(s) to find out if the passenger(s) have time for a vacation, search previous destinations of the passenger(s) and perhaps other information to provide suggestions for vacation destinations, and, if the passenger(s) agree, take the passenger(s) to a selected vacation destination.

For example, consider an autonomous vehicle, AVD, with one passenger, D, who invokes the Day Trip application and authorizes AVD to search D's personal calendar and other information. AVD can examine D's calendar records to learn that D has enough time for an overnight trip, examine D's past and planned destinations, and provide one or more suggestions for a day trip. In this example, D takes hikes at four relatively close state and national parks on a regular basis, and frequently visits a sea-side village on weekends. AVD can then inform D that D's calendar indicates that D has time for an overnight trip and suggest five possible destinations for the overnight trip: each of the four parks and the sea-side village. D can then either decline to take the overnight trip, ask for other possible destinations, select one of the five suggested destinations for the trip, or select a different destination than those suggested. If D selects a destination for the trip, AVD can navigate to that destination. In some cases, AVD can also address logistical concerns for the trip, such as, but not limited to, booking lodging at the destination, advising about possible weather concerns at the destination, and/or selecting routes with less traffic to provide a more enjoyable trip.

A community of autonomous vehicles can communicate to enhance these applications. For example, suppose that passengers P1, P2, and P3 share AV1, and friends F1, F2, and F3, share another autonomous vehicle, AV2, and that the "Day Trip" application has been launched on AV1. Then, if so authorized by P1, P2, and P3, AV1 can inform AV2 that the Day Trip application has been launched. AV2 can then inform F1, F2, and F3 that P1, P2, and P3 are thinking about taking a Day Trip. One or more of F1, F2, and F3 can then contact P1, P2, and P3 and ask for information about the day trip; e.g., destination, duration, and consider joining the day trip. If so authorized, AV1 and AV2 can then share information to suggest Day Trip destinations that most or all of F1, F2, F3, P1, P2, and P3 have visited and/or planned to visit.

Many other autonomous vehicle applications are possible that are based on the location of the autonomous vehicles, the status of the autonomous vehicle, and the autonomous vehicle's ability to select possible trip destination(s). The autonomous vehicle applications can make trips in the autonomous vehicle safer, more enjoyable, and less stressful, while increasing the utility and acceptance of autonomous vehicles. Also, autonomous vehicles can enable drivers and passengers to engage in other tasks while being driven to their destinations. As passengers in autonomous vehicles are not generally involved in driving, the autonomous vehicle's passenger(s) can utilize mobile and/or computing applications for entertainment, productivity, and consumption. For example, a person OP can work or perform other d tasks while the autonomous vehicle drives to a Day Trip location. By letting the autonomous vehicle handle the details of driving and navigating, passengers can reduce stress and increase their enjoyment of both the journey and the destination.

Example Operations

FIG. 1 is a flow chart of method 100, according to an example embodiment. Method 100 can be carried out by an autonomous vehicle application manager, such as autonomous vehicle application manager 560 described below in the context of at least FIGS. 5-7.

Method 100 begins at block 110, where a status of the autonomous vehicle can be determined using an autonomous vehicle application manager. In some embodiments, the status of the autonomous vehicle can include a status about a location of the autonomous vehicle. In other embodiments, the status of the autonomous vehicle can include a status of amount of fuel for the autonomous vehicle.

At block 120, a possible destination for the autonomous vehicle can be determined using the autonomous vehicle application manager. In some embodiments, determining the possible destination of the autonomous vehicle can involve determining one or more previous destinations of the autonomous vehicle and determining the possible destination based on the one or more previous destinations.

In particular embodiments, the status of the autonomous vehicle can include a status of one or more current passengers of the autonomous vehicle. In these embodiments, determining the possible destination for the autonomous vehicle can include: (a) for each previous destination of the one or more previous destinations: (a1) determining one or more passengers associated with the previous destination, (a2) determining whether the one or more current passengers include at least one passenger of the one or more passengers associated with the previous destination, and (a3) in response to determining that the one or more current passengers include at least one passenger of the one or more passengers associated with the previous destination, adding the previous destination to a list of possible destinations; and (b) determining the possible destination from the list of possible destinations.

In other embodiments, determining the possible destination for the autonomous vehicle can include determining a location of a friend of a current passenger of the one or more current passengers. In still other embodiments, determining the possible destination for the autonomous vehicle can include determining an amount of free time for a current passenger of the one or more current passengers.

At block 130, a hint related to the possible destination based on the status of the autonomous vehicle can be generated using the autonomous vehicle application manager.

At block 140, the hint can be provided using the autonomous vehicle application manager.

At block 150, input related to the hint is received at the autonomous vehicle application manager.

At block 160, based on the input, the autonomous vehicle application manager can determine whether to navigate the autonomous vehicle to the possible destination.

At block 170, after determining to navigate the autonomous vehicle to the possible destination, the autonomous vehicle application manager can direct the autonomous vehicle to travel to the possible destination.

Example Location-Based Autonomous Vehicle Applications

Figure 2:
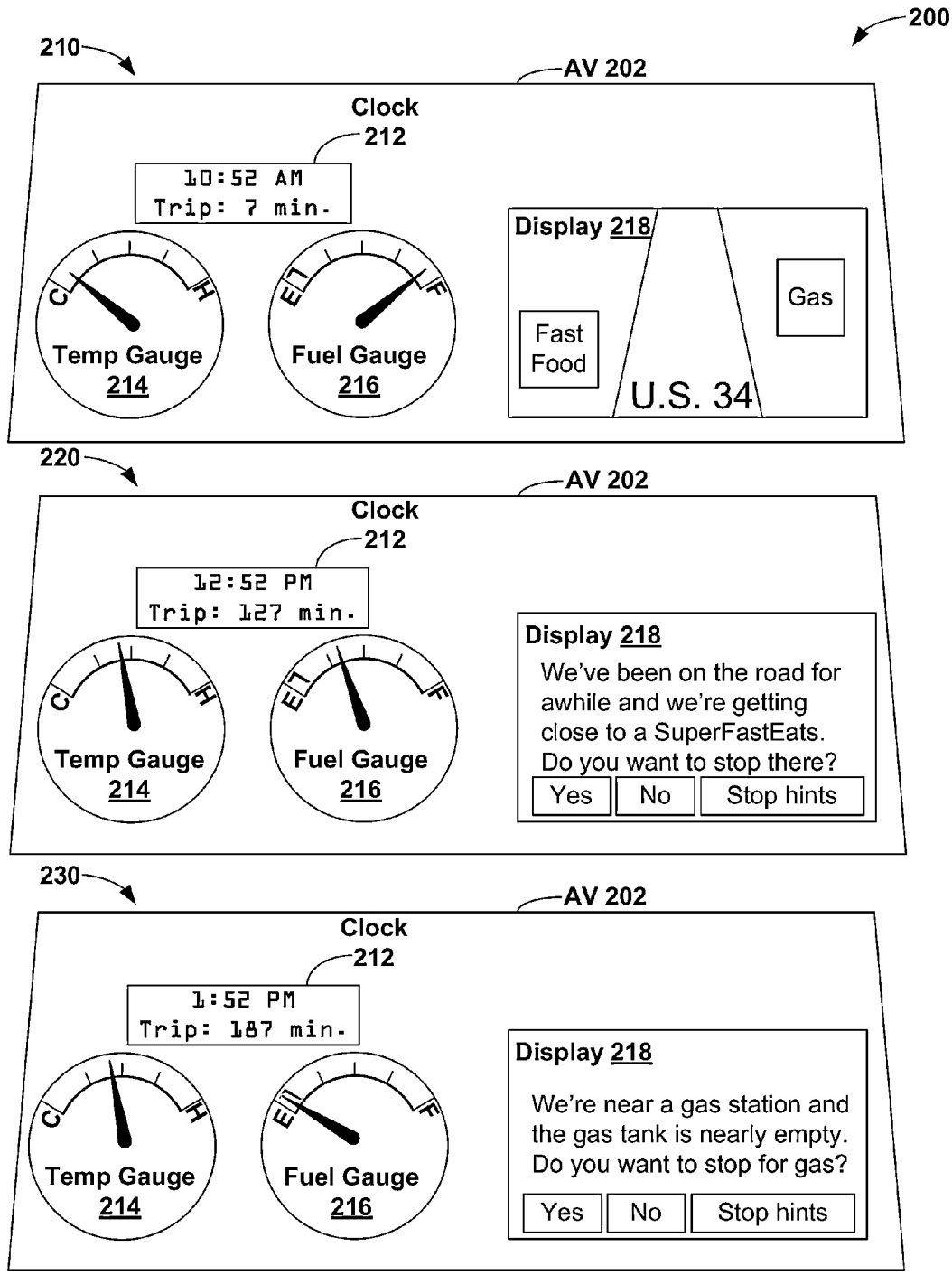
FIG. 2 shows an example scenario of utilizing an enhanced navigation system application of an autonomous vehicle, according to an example embodiment.

FIG. 2 shows a scenario 200 of utilizing an enhanced navigation system application of an autonomous vehicle (AV) 202, according to an example embodiment.

Scenario 200 starts at 210 with autonomous vehicle 202 engaged in taking passenger(s) on a journey or trip that started at 10:45 AM. Clock 212 indicates that the current time is now 10:52 AM and the current trip has lasted 7 minutes. Temperature gauge 214 indicates that the autonomous vehicle's fluid temperature is just warmer than the cold setting of the gauge. Fuel gauge 216 indicates that a fuel tank of the autonomous vehicle is nearly full. Display 218 is set to show a navigation display of a current position of the autonomous vehicle on U.S. Highway 34 and near "Fast Food" and "Gas" buildings.

As the passengers of autonomous vehicle 202 are not typically involved with driving or navigating autonomous vehicle 202, display 218 can be utilized for additional purposes along with navigation displays, such as showing movies, videos and/or other types of audio-visual displays, communicating with other entities via e-mail, SMS, voice, and/or via other techniques, playing games, and many other purposes.

Scenario 200 continues at 220, which clock 212 indicates is 12:52 PM. At this point, the current trip has lasted 127 minutes, or just over two hours. Before and during scenario 200, autonomous vehicle 202 can learn behaviors of its passengers from previous trips. In scenario 200, the passengers of autonomous vehicle 202 previously often have performed the following behaviors: (a) stopped every two hours or so, especially between 12:30 PM and 1:30 PM, and (b) eaten at the "SuperFastEats" chain of restaurants. Based on behavior (a), autonomous vehicle 202 can suggest a stop after 2 hours, when the 2 hour mark is between 12:30 PM and 1:30 PM. Based on behavior (b), autonomous vehicle 202 can weight restaurants of the "SuperFastEats" chain as having a higher interest to the passengers than other restaurants. Based on the current status of autonomous vehicle 202, the current trip, and/or the past behaviors of the passengers, autonomous vehicle 202 can generate "hints" for stops or other changes in the current trip. In this instance, as autonomous vehicle 202 is near a SuperFastEats restaurant and the current trip has taken a bit over two hours, autonomous vehicle 202 can generate a hint to stop at the nearby SuperFastEats, as shown in display 218. Display 218 can be configured with a touch screen to permit touch-based interface for commands, data, etc. between the passengers and autonomous vehicle 202. Other interfaces, e.g., voice, keyboard, gaze-based, etc. between the passengers and autonomous vehicle 202 are possible as well.

At 220, display 218 provides three options to the passengers to the hint to stop autonomous vehicle 202 at the nearby SuperFastEats: a "yes" option to stop, a "no" option to continue, and "Stop hints" to disable generation and/or display of hints by autonomous vehicle 202. During scenario 200, the passengers choose the "no" option and so do not stop at the restaurant.

Scenario 200 continues at 230, which clock 212 indicates is 1:52 PM. At this point, the current trip has lasted 187 minutes, or just over three hours. Additionally, fuel gauge 216 is shown at 230 as indicating a nearly-empty fuel tank and the current location of autonomous vehicle 202 is near a gas station. Based on the fuel status of autonomous vehicle 202 and current location, autonomous vehicle 202 can generate and display a hint to stop for gas (or other fuel) at this time. In some scenarios, autonomous vehicle 202 can use additional criteria than proximity and fuel tank status to select a fuel station. These additional criteria can include, but are not limited to, fuel prices at other nearby station(s), preferred brands of fuel and/or fuel stations as selected, either directly or indirectly by the passengers, reviews of fuel stations, and proximity to other points of interest (e.g., if the destination is nearby, autonomous vehicle 202 can postpone obtaining fuel until after autonomous vehicle 202 has dropped the passengers off at the destination.).

Figure 3:
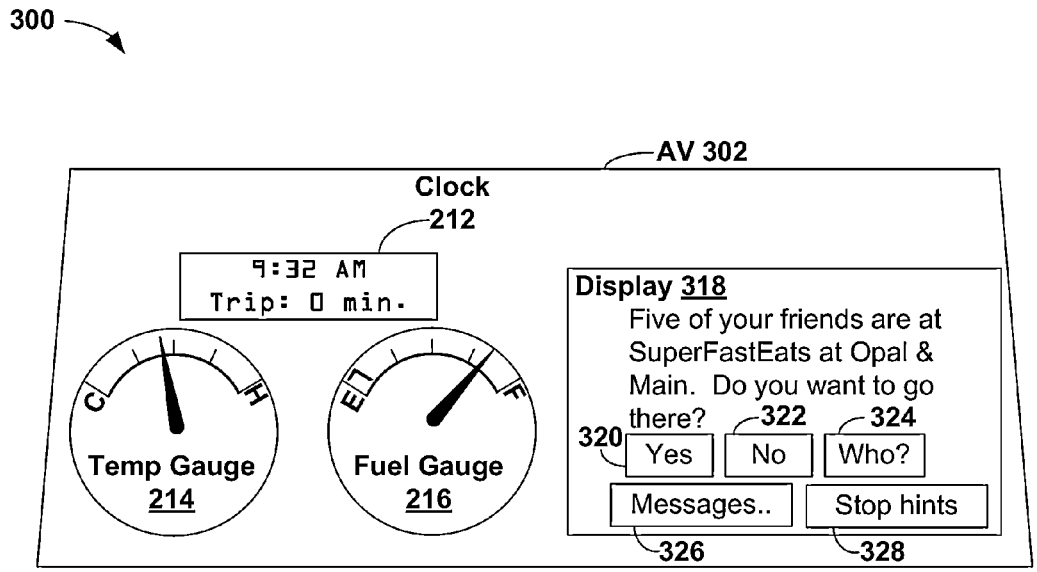
FIG. 3 shows an example scenario of an autonomous vehicle performing a meetup application, according to an example embodiment.

FIG. 3 shows a scenario 300 of autonomous vehicle 302 performing a meetup application, according to an example embodiment. Autonomous vehicle 302 has a similar display to that of autonomous vehicle 202 shown in FIG. 2, with clock 212, temperature gauge 214, and fuel gauge 216. Display 318 is a touch-sensitive display slightly larger than display 218 for autonomous vehicle 202. In some scenarios, autonomous vehicle 202 can perform the operations described herein for autonomous vehicle 302.

When passenger(s) of autonomous vehicle 302 enter the vehicle or based on other criteria, e.g., upon command, autonomous vehicle 302 is configured to execute the meetup application if authorized by the passenger(s) of autonomous vehicle 302. The meetup application can first provide each passenger of autonomous vehicle 302 that is interested in using the meetup application the opportunity to control whether the meetup application collects and/or examines information available to the passenger (e.g., information about a passenger's social network, messages to/from the passenger, social actions or activities, profession, a passenger's preferences, or a passenger's current location).

If appropriate authorization is granted, the meetup application can examine the information available to the passenger(s) to find location(s) of friend(s), family members, co-workers, and/or other persons of interest, as indicated, specified, and appropriately authorized by the passenger(s). Upon finding one or more "meetup locations" where persons of interest are located, autonomous vehicle 302 can generate a hint informing the passenger(s) about such location(s) and offer to take the passenger to that location.

For example, FIG. 3 shows display 318 with a hint to the passenger(s) that "Five of your friends are at SuperFastEats at Opal & Main. Do you want to go there?" In response, the passenger(s) can select one or more of the following buttons on display 318: "Yes" button 320 to have autonomous vehicle 302 drive to the SuperFastEats at Opal & Main, "No" button 322 to ignore the hint, "Who?" button 324 to have autonomous vehicle 302 display a list of friends at the meetup location, "Messages . . . " button 326 to have autonomous vehicle 302 provide the messages leading to the hint; e.g., e-mail, SMS messages, voice mail, social networking messages with location information, location information provided by other autonomous vehicles, and other possible information, and "Stop Hints" button 328 to disable generation and/or display of hints by autonomous vehicle 302. Other interfaces, e.g., voice, keyboard, gaze-based, etc. between passenger(s) of autonomous vehicle 302 and autonomous vehicle 302 are possible as well.

Figure 4:
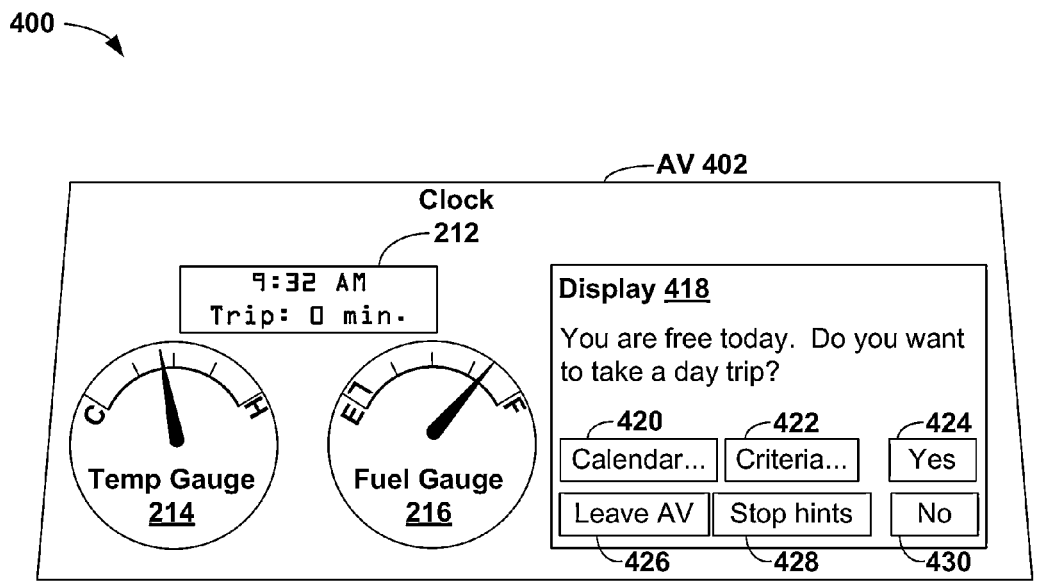
FIG. 4 shows an example scenario of an autonomous vehicle performing a Day Trip application, according to an example embodiment.

FIG. 4 shows a scenario 400 of autonomous vehicle 402 performing a "Day Trip" application, according to an example embodiment. Autonomous vehicle 402 has a similar display to that of autonomous vehicles 202, 302 shown in respective FIGS. 2 and 3, with clock 212, temperature gauge 214, and fuel gauge 216. Display 418 is a touch-sensitive display slightly larger than display 318 for autonomous vehicle 302. In some scenarios, autonomous vehicle 202 and/or autonomous vehicle 302 can perform the operations described herein for autonomous vehicle 402.

When passenger(s) of autonomous vehicle 402 enter the vehicle or based on other criteria, e.g., upon command, autonomous vehicle 402 is configured to execute the Day Trip application. The Day Trip application can first provide each passenger of autonomous vehicle 402 that is interested in using the Day Trip application the opportunity to control whether the Day Trip application collects and/or examines information available to the passenger (e.g., information about a passenger's social network, messages to/from the passenger, social actions or activities, profession, a passenger's preferences, or a passenger's current location).

If access to information about the passenger(s) is granted, the Day Trip application can examine calendar and/or other messages related to the passenger(s) to find out if the passenger(s) have time for a vacation, search previous destinations of the passenger(s) and perhaps other information to provide suggestions for vacation destinations, and, if the passenger(s) agree, take the passenger(s) to a selected vacation destination. Upon determining an amount of free time for the passenger(s), and one or more destinations, autonomous vehicle 402 can then determine whether the passenger(s) have enough free time to permit a round trip to the destination(s).

For example, scenario 400 takes place on a Saturday with autonomous vehicle 402 having one passenger, P, who is free until Monday at 9 AM. In the past, autonomous vehicle 402 has taken P to three locations for overnight visits: City C, National Park NP, and small town ST. Autonomous vehicle 402 has also performed searches for P about national parks NP2, NP3, and NP4, small town ST2, and city C2, all of which are within one day's travel from a current location of autonomous vehicle 402. Based on this information, autonomous vehicle 402 can suggest that P take a day trip to some or all of Cities C, C2, National Parks NP, NP2, NP3, NP4, and small towns ST, ST2.

In response to the hint of "You are free today. Do you want to take a day trip?", P can select "Calendar" button 420 to check a calendar, scheduler, and/or other information to verify that the day is actually free. Selection of "Criteria" button 422 can permit P to provide autonomous vehicle 402 with additional information for selecting aspects of a destination and/or the journey to the destination; e.g., place(s) to sleep and/or eat while on the day trip, and/or locations to visit along the way. Selection of "Yes" button 424 can lead to autonomous vehicle 402 selecting a destination for the day trip and taking P on the trip, while selection of "No" button 430 can lead to autonomous vehicle 402 to stop the Day Trip application without taking a journey. Selection of "Leave AV" button 426 can permit P to suspend the Day Trip application to leave the autonomous vehicle; e.g., to get gear or luggage for the trip, to check the status of P's home/source location for the day trip, and/or to inform autonomous vehicle 402 that P wants to leave temporarily for any reason. "Stop hints" button 428 can be used to disable generation and/or display of hints by autonomous vehicle 402. Other interfaces, e.g., voice, keyboard, gaze-based, etc. between P and autonomous vehicle 402 are possible as well.

Example Vehicle Systems

Figure 5:
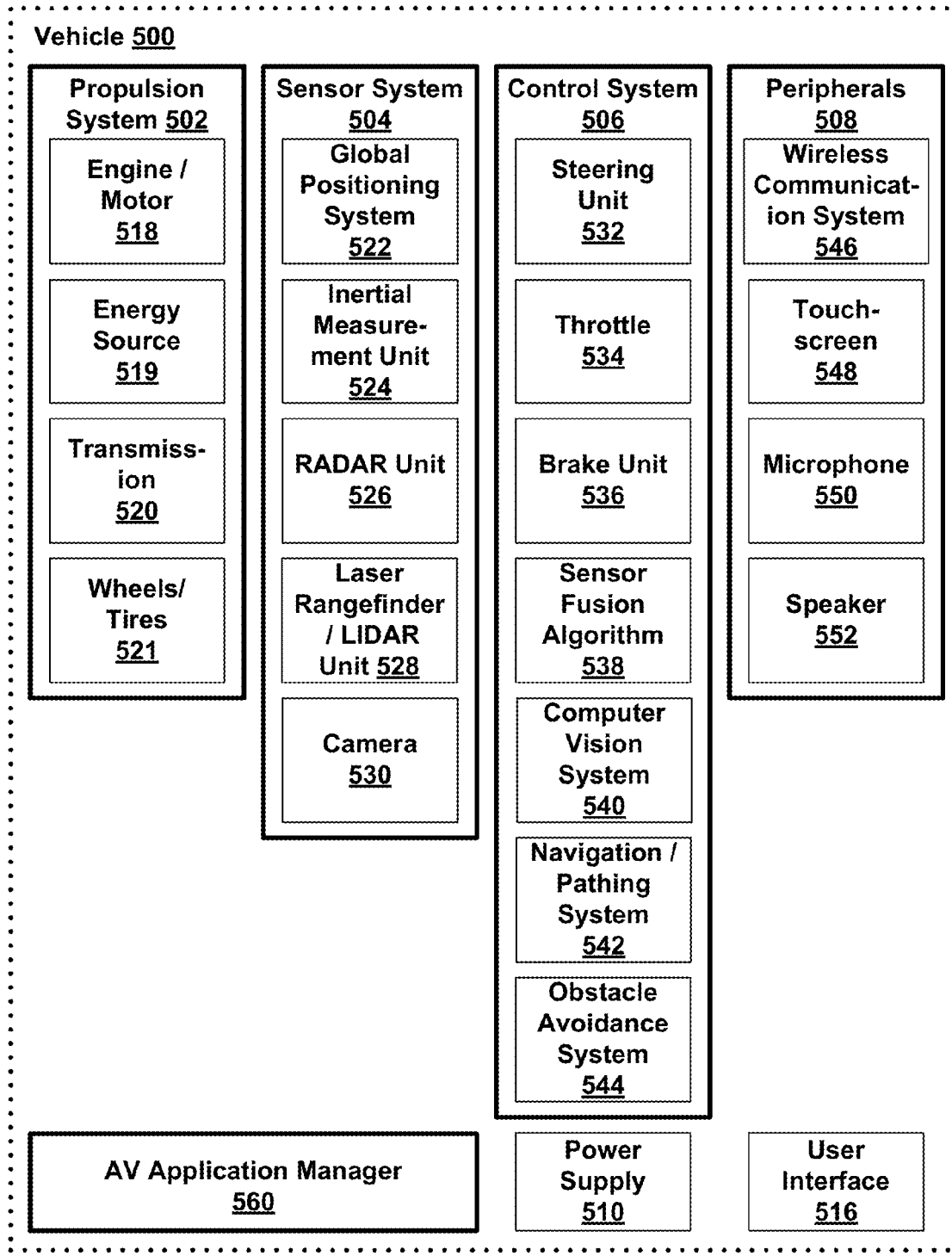
FIG. 5 is a functional block diagram illustrating a vehicle, according to an example embodiment.

FIG. 5 is a functional block diagram illustrating a vehicle 500, according to an example embodiment. The vehicle 500 can be configured to operate fully or partially in an autonomous mode. For example, the vehicle 500 can control itself while in the autonomous mode, and can be operable to determine a current state of the vehicle and its environment, determine a predicted behavior of at least one other vehicle in the environment, determine a confidence level that can correspond to a likelihood of the at least one other vehicle to perform the predicted behavior, and control the vehicle 500 based on the determined information. While in autonomous mode, the vehicle 500 can be configured to operate without human interaction.

The vehicle 500 can include various subsystems such as a propulsion system 502, a sensor system 504, a control system 506, one or more peripherals 508, as well as a power supply 510, an autonomous vehicle application manager 560, and a user interface 516. The vehicle 500 can include more or fewer subsystems and each subsystem can include multiple aspects. Further, each of the subsystems and aspects of vehicle 500 can be interconnected. Thus, one or more of the described functions of the vehicle 500 can be divided up into additional functional or physical components, or combined into fewer functional or physical components. In some further examples, additional functional and/or physical components can be added to the examples illustrated by FIG. 5.

The propulsion system 502 can include components operable to provide powered motion for the vehicle 500. In an example embodiment, the propulsion system 502 can include an engine/motor 518, an energy source 519, a transmission 520, and wheels/tires 521. The engine/motor 518 can be any combination of an internal combustion engine, an electric motor, steam engine, Stirling engine, or other types of engines and/or motors. In some embodiments, the engine/motor 518 can be configured to convert energy source 519 into mechanical energy. In some embodiments, the propulsion system 502 can include multiple types of engines and/or motors. For instance, a gas-electric hybrid car can include a gasoline engine and an electric motor. Other examples are possible.

The energy source 519 can represent a source of energy that can, in full or in part, power the engine/motor 518. That is, the engine/motor 518 can be configured to convert the energy source 519 into mechanical energy. Examples of energy sources 519 include gasoline, diesel, other petroleumbased fuels, propane, other compressed gas-based fuels, ethanol, solar panels, batteries, and other sources of electrical power. The energy source(s) 519 can additionally or alternatively include any combination of fuel tanks, batteries, capacitors, and/or flywheels. The energy source 519 can also provide energy for other systems of the vehicle 500.

The transmission 520 can include aspects that are operable to transmit mechanical power from the engine/motor 518 to the wheels/tires 521. To this end, the transmission 520 can include a gearbox, clutch, differential, and drive shafts. The transmission 520 can include other aspects. The drive shafts can include one or more axles that can be coupled to the one or more wheels/tires 521.

The wheels/tires 521 of vehicle 500 can be configured in various formats, including a unicycle, bicycle/motorcycle, tricycle, or car/truck four-wheel format. Other wheel/tire geometries are possible, such as those including six or more wheels. Any combination of the wheels/tires 521 of vehicle 500 can be operable to rotate differentially with respect to other wheels/tires 521. The wheels/tires 521 can represent at least one wheel that is fixedly attached to the transmission 520 and at least one tire coupled to a rim of the wheel that can make contact with the driving surface. The wheels/tires 521 can include any combination of metal and rubber, or another combination of materials.

The sensor system 504 can include a number of sensors configured to sense information about an environment of the vehicle 500. For example, the sensor system 504 can include a Global Positioning System (GPS) 522, an inertial measurement unit (IMU) 524, a RADAR unit 526, a laser rangefinder/LIDAR unit 528, and a camera 530. The sensor system 504 can also include sensors configured to monitor internal systems of the vehicle 500 (e.g., $O_2$ monitor, fuel gauge, engine oil temperature). Other sensors are possible as well.

One or more of the sensors included in sensor system 504 can be configured to be actuated separately and/or collectively in order to modify a position and/or an orientation of the one or more sensors.

The GPS 522 can be any sensor configured to estimate a geographic location of the vehicle 500. To this end, GPS 522 can include a transceiver operable to provide information regarding the position of the vehicle 500 with respect to the Earth.

The IMU 524 can include any combination of sensors (e.g., accelerometers and gyroscopes) configured to sense position and orientation changes of the vehicle 500 based on inertial acceleration.

The RADAR unit 526 can represent a system that utilizes radio signals to sense objects within the local environment of the vehicle 500. In some embodiments, in addition to sensing the objects, the RADAR unit 526 can additionally be configured to sense the speed and/or heading of the objects.

Similarly, the laser rangefinder or LIDAR unit 528 can be any sensor configured to sense objects in the environment in which the vehicle 500 is located using lasers. In an example embodiment, the laser rangefinder/LIDAR unit 528 can include one or more laser sources, a laser scanner, and one or more detectors, among other system components. The laser rangefinder/LIDAR unit 528 can be configured to operate in a coherent (e.g., using heterodyne detection) or an incoherent detection mode.

The camera 530 can include one or more devices configured to capture a plurality of images of the environment of the vehicle 500. The camera 530 can be a still camera or a video camera.

The control system 506 can be configured to control operation of the vehicle 500 and its components. Accordingly, the control system 506 can include various aspects include steering unit 532, throttle 534, brake unit 536, a sensor fusion algorithm 538, a computer vision system 540, a navigation/pathing system 542, and an obstacle avoidance system 544.

The steering unit 532 can represent any combination of mechanisms that can be operable to adjust the heading of vehicle 500.

The throttle 534 can be configured to control, for instance, the operating speed of the engine/motor 518 and, in turn, control the speed of the vehicle 500.

The brake unit 536 can include any combination of mechanisms configured to decelerate the vehicle 500. The brake unit 536 can use friction to slow the wheels/tires 521. In other embodiments, the brake unit 536 can convert the kinetic energy of the wheels/tires 521 to electric current. The brake unit 536 can take other forms as well.

The sensor fusion algorithm 538 can be an algorithm (or a computer program product storing an algorithm) configured to accept data from the sensor system 504 as an input. The data can include, for example, data representing information sensed at the sensors of the sensor system 504. The sensor fusion algorithm 538 can include, for instance, a Kalman filter, Bayesian network, or other algorithm. The sensor fusion algorithm 538 can further provide various assessments based on the data from sensor system 504. In an example embodiment, the assessments can include evaluations of individual objects and/or features in the environment of vehicle 500, evaluation of a particular situation, and/or evaluate possible impacts based on the particular situation. Other assessments are possible.

The computer vision system 540 can be any system operable to process and analyze images captured by camera 530 in order to identify objects and/or features in the environment of vehicle 500 that can include traffic signals, road way boundaries, and obstacles. The computer vision system 540 can use an object recognition algorithm, a Structure From Motion (SFM) algorithm, video tracking, and other computer vision techniques. In some embodiments, the computer vision system 540 can be additionally configured to map an environment, track objects, estimate the speed of objects, etc.

The navigation and pathing system 542 can be any system configured to determine a driving path for the vehicle 500. The navigation and pathing system 542 can additionally be configured to update the driving path dynamically while the vehicle 500 is in operation. In some embodiments, the navigation and pathing system 542 can be configured to incorporate data from the sensor fusion algorithm 538, the GPS 522, and one or more predetermined maps so as to determine the driving path for vehicle 500.

The obstacle avoidance system 544 can represent a control system configured to identify, evaluate, and avoid or otherwise negotiate potential obstacles in the environment of the vehicle 500.

The control system 506 can additionally or alternatively include components other than those shown and described.

Peripherals 508 can be configured to allow interaction between the vehicle 500 and external sensors, other vehicles, other computer systems, and/or a user. For example, peripherals 508 can include a wireless communication system 546, a touchscreen 548, a microphone 550, and/or a speaker 552.

In an example embodiment, the peripherals 508 can provide, for instance, means for a user of the vehicle 500 to interact with the user interface 516. To this end, the touchscreen 548 can provide information to a user of vehicle 500. The user interface 516 can also be operable to accept input from the user via the touchscreen 548. The touchscreen 548 can be configured to sense at least one of a position and a movement of a user's finger via capacitive sensing, resistance sensing, or a surface acoustic wave process, among other possibilities. The touchscreen 548 can be capable of sensing finger movement in a direction parallel or planar to the touchscreen surface, in a direction normal to the touchscreen surface, or both, and can also be capable of sensing a level of pressure applied to the touchscreen surface. The touchscreen 548 can be formed of one or more translucent or transparent insulating layers and one or more translucent or transparent conducting layers. The touchscreen 548 can take other forms as well.

In other instances, the peripherals 508 can provide means for the vehicle 500 to communicate with devices within its environment. The microphone 550 can be configured to receive audio (e.g., a voice command or other audio input) from a user of the vehicle 500. Similarly, the speakers 552 can be configured to output audio to the user of the vehicle 500.

In one example, the wireless communication system 546 can be configured to wirelessly communicate with one or more devices directly or via a communication network. For example, wireless communication system 546 can use 3G cellular communication, such as CDMA, EVDO, GSM/GPRS, or 4G cellular communication, such as WiMAX or LTE. Alternatively, wireless communication system 546 can communicate with a wireless local area network (WLAN), for example, using WiFi. In some embodiments, wireless communication system 546 can communicate directly with a device, for example, using an infrared link, Bluetooth, or ZigBee. Other wireless protocols, such as various vehicular communication systems, are possible within the context of the disclosure. For example, the wireless communication system 546 can include one or more dedicated short range communications (DSRC) devices that can include public and/or private data communications between vehicles and/or roadside stations.

The power supply 510 can provide power to various components of vehicle 500 and can represent, for example, a rechargeable lithium-ion or lead-acid battery. In some embodiments, one or more banks of such batteries can be configured to provide electrical power. Other power supply materials and configurations are possible. In some embodiments, the power supply 510 and energy source 519 can be implemented together, as in some all-electric cars.

Many or all of the functions of vehicle 500 can be controlled by a computing device 700, such as discussed in detail below with respect to FIG. 7A, or by multiple computing devices, such as discussed in detail below with respect to FIG. 7B.

The vehicle 500 can include a user interface 516 for providing information to or receiving input from a user of vehicle 500. The user interface 516 can control or enable control of content and/or the layout of interactive images that can be displayed on the touchscreen 548. Further, the user interface 516 can include one or more input/output devices within the set of peripherals 508, such as the wireless communication system 546, the touchscreen 548, the microphone 550, and the speaker 552.

The autonomous vehicle application manager 560 can control the function of the vehicle 500 based on inputs received from various subsystems (e.g., propulsion system 502, sensor system 504, and control system 506), as well as from the user interface 516. For example, the autonomous vehicle application manager 560 can utilize input from the control system 506 in order to control the steering unit 532 to avoid an obstacle detected by the sensor system 504 and the obstacle avoidance system 544. In an example embodiment, the autonomous vehicle application manager 560 can control many aspects of the vehicle 500 and its subsystems. In other embodiments, autonomous vehicle application manager 560 can be configured to carry out part or all of the herein-described methods; e.g., method 100 and/or perform some or all the autonomous vehicle applications described herein, and perhaps other autonomous vehicle applications; e.g., the above-disclosed enhanced navigation system, meetup, and/or Day Trip application(s).

In an example, autonomous vehicle application manager 560 could be provided as a computing device, such as computing device 700, in the vehicle 500. Alternatively, although FIG. 5 shows various components of vehicle 500, i.e., wireless communication system 546 and autonomous vehicle application manager 560, as being integrated into the vehicle 500, one or more of these components can be mounted or associated separately from the vehicle 500. For example, autonomous vehicle application manager 560 can, in part or in full, exist separate from the vehicle 500. Thus, the vehicle 500 can be provided in the form of device aspects that can be located separately or together. The device aspects that make up vehicle 500 can be communicatively coupled together in a wired and/or wireless fashion.

Figure 6:
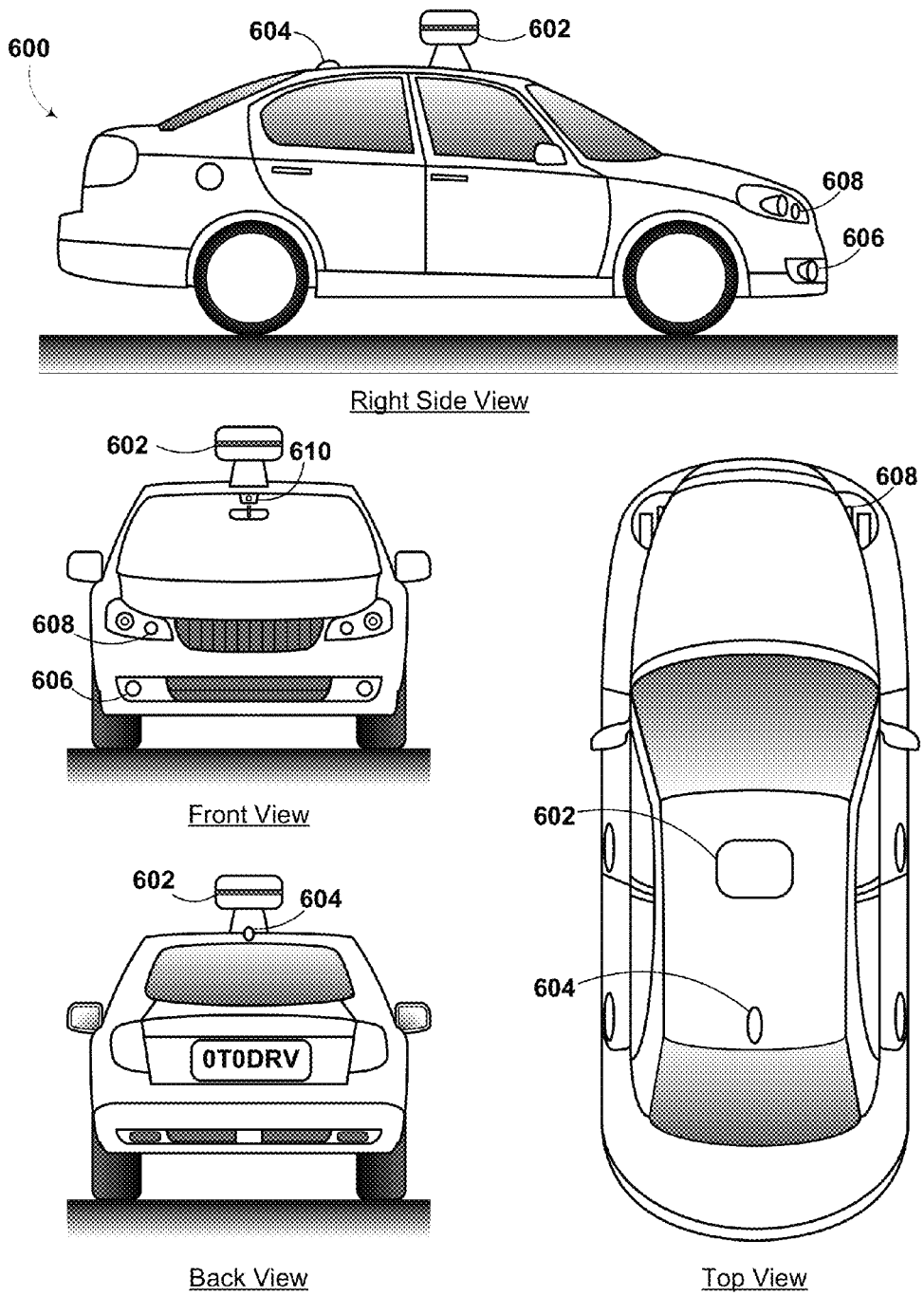
FIG. 6 shows a vehicle that can be similar or identical to the vehicle described with respect to FIG. 5, according to an example embodiment.

FIG. 6 shows a vehicle 600 that can be similar or identical to vehicle 500 described with respect to FIG. 5, in accordance with an example embodiment. Although vehicle 600 is illustrated in FIG. 6 as a car, other embodiments are possible. For instance, the vehicle 600 can represent a truck, a van, a semi-trailer truck, a motorcycle, a golf cart, an off-road vehicle, or a farm vehicle, among other examples.

In some embodiments, vehicle 600 can include a sensor unit 602, a wireless communication system 604, a LIDAR unit 606, a laser rangefinder unit 608, and a camera 610. The aspects of vehicle 600 can include some or all of the aspects described for FIG. 5.

The sensor unit 602 can include one or more different sensors configured to capture information about an environment of the vehicle 600. For example, sensor unit 602 can include any combination of cameras, RADARs, LIDARs, range finders, and acoustic sensors. Other types of sensors are possible. In an example embodiment, the sensor unit 602 can include one or more movable mounts that can be operable to adjust the orientation of one or more sensors in the sensor unit 602. In one embodiment, the movable mount can include a rotating platform that can scan sensors so as to obtain information from each direction around the vehicle 600. In another embodiment, the movable mount of the sensor unit 602 can be moveable in a scanning fashion within a particular range of angles and/or azimuths. The sensor unit 602 can be mounted atop the roof of a car, for instance, however other mounting locations are possible. Additionally, the sensors of sensor unit 602 can be distributed in different locations and need not be collocated in a single location. Some possible sensor types and mounting locations include LIDAR unit 606 and laser rangefinder unit 608. Furthermore, each sensor of sensor unit 602 can be configured to be moved or scanned independently of other sensors of sensor unit 602.

The wireless communication system 604 can be located on a roof of the vehicle 600 as depicted in FIG. 6. Alternatively, the wireless communication system 604 can be located, fully or in part, elsewhere. The wireless communication system 604 can include wireless transmitters and receivers that can be configured to communicate with devices external or internal to the vehicle 600. Specifically, the wireless communication system 604 can include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 610 can be any camera (e.g., a still camera, a video camera, etc.) configured to capture a plurality of images of the environment of the vehicle 600. To this end, the camera 610 can be configured to detect visible light, or can be configured to detect light from other portions of the spectrum, such as infrared or ultraviolet light. Other types of cameras are possible as well.

The camera 610 can be a two-dimensional detector, or can have a three-dimensional spatial range. In some embodiments, the camera 610 can be, for example, a range detector configured to generate a two-dimensional image indicating a distance from the camera 610 to a number of points in the environment. To this end, the camera 610 can use one or more range detecting techniques. For example, the camera 610 can use a structured light technique in which the vehicle 600 illuminates an object in the environment with a predetermined light pattern, such as a grid or checkerboard pattern and uses the camera 610 to detect a reflection of the predetermined light pattern off the object. Based on distortions in the reflected light pattern, the vehicle 600 can determine the distance to the points on the object. The predetermined light pattern can comprise infrared light, or light of another wavelength.

As another example, the camera 610 can use a laser scanning technique in which the vehicle 600 emits a laser and scans across a number of points on an object in the environment. While scanning the object, the vehicle 600 uses the camera 610 to detect a reflection of the laser off the object for each point. Based on a length of time it takes the laser to reflect off the object at each point, the vehicle 600 can determine the distance to the points on the object. As yet another example, the camera 610 can use a time-of-flight technique in which the vehicle 600 emits a light pulse and uses the camera 610 to detect a reflection of the light pulse off an object at a number of points on the object. In particular, the camera 610 can include a number of pixels, and each pixel can detect the reflection of the light pulse from a point on the object. Based on a length of time it takes the light pulse to reflect off the object at each point, the vehicle 600 can determine the distance to the points on the object. The light pulse can be a laser pulse. Other range detecting techniques are possible as well, including stereo triangulation, sheet-of-light triangulation, interferometry, and coded aperture techniques, among others. The camera 610 can take other forms as well.

The camera 610 can be mounted inside a front windshield of the vehicle 600. Specifically, as illustrated, the camera 610 can capture images from a forward-looking view with respect to the vehicle 600. Other mounting locations and viewing angles of camera 610 are possible, either inside or outside the vehicle 600.

The camera 610 can have associated optics that can be operable to provide an adjustable field of view. Further, the camera 610 can be mounted to vehicle 600 with a movable mount that can be operable to vary a pointing angle of the camera 610.

Within the context of the present disclosure, the components of vehicle 500 and/or vehicle 600 can be configured to work in an interconnected fashion with other components within or outside their respective systems. For instance, the camera 530 can capture a plurality of images that can represent sensor data relating to an environment of the vehicle 500 operating in an autonomous mode. The environment can include another vehicle blocking a known traffic signal location ahead of the vehicle 500. Based on the plurality of images, an inference system (which can include autonomous vehicle application manager 560, sensor system 504, and control system 506) can infer that the unobservable traffic signal is red based on sensor data from other aspects of the environment (for instance images indicating the blocking vehicle's brake lights are on). Based on the inference, the autonomous vehicle application manager 560 and propulsion system 502 can act to control the vehicle 500.

Computing Device Architecture

Figure 7A:
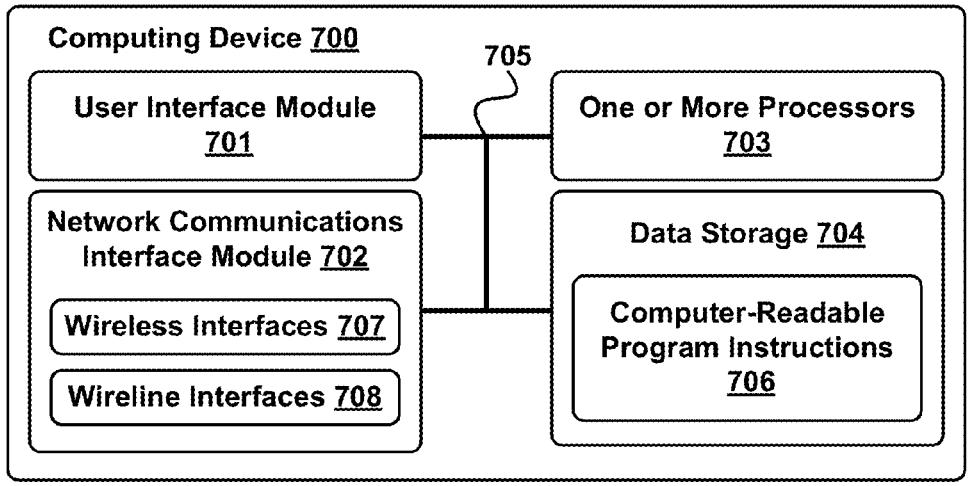
FIG. 7A is a block diagram of a computing device, according to an example embodiment.

FIG. 7A is a block diagram of computing device 700, in accordance with an example embodiment. Computing device 700 shown in FIG. 7A could be configured to perform one or more functions of autonomous vehicle application manager 560 and/or other functions. Computing device 700 may include a user interface module 701, a network-communication interface module 702, one or more processors 703, and data storage 704, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706 that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706, and perhaps additional data. In some embodiments, data storage 704 can additionally include storage required to perform at least part of the herein-described methods and techniques and/or at least part of the functionality of the herein-described devices and networks.

Cloud-Based Servers

Figure 7B:
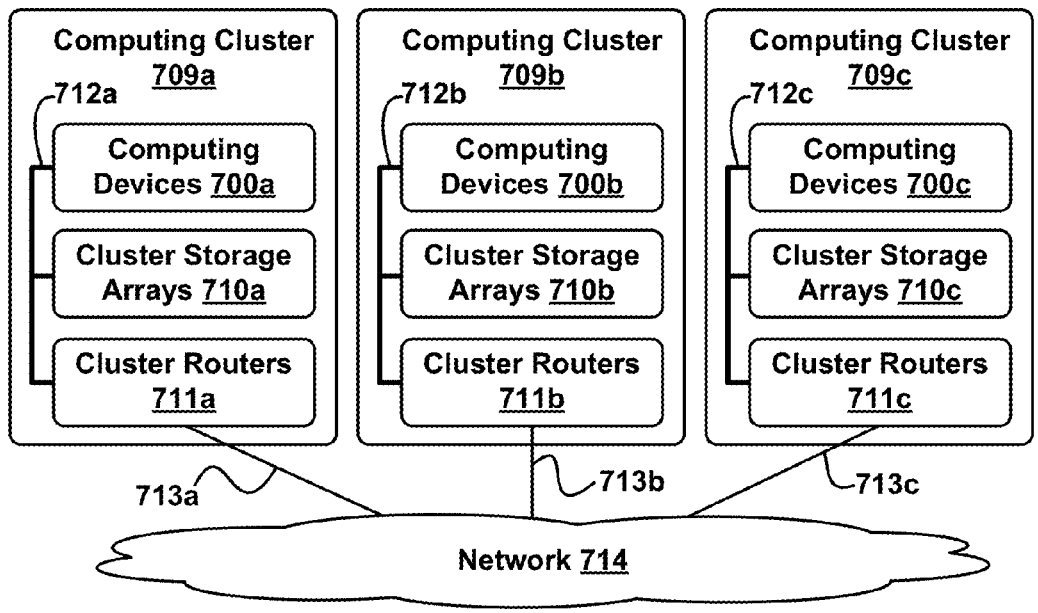
FIG. 7B depicts a network of computing clusters arranged as a cloud-based server system, according to an example embodiment.

FIG. 7B depicts a network 714 of computing clusters 709a, 709b, 709c arranged as a cloud-based server system, in accordance with an example embodiment. autonomous vehicle application manager 560 can be a cloud-based device that stores program logic and/or data of cloud-based applications and/or services. In some embodiments, autonomous vehicle application manager 560 can be a single computing device residing in a single computing center; e.g., within vehicle 500. In other embodiments, autonomous vehicle application manager 560 can include multiple computing devices in a single computing center, or even multiple computing devices located in multiple computing centers located in diverse geographic locations.

In some embodiments, data and services at autonomous vehicle application manager 560 can be encoded as computer readable information stored in non-transitory, tangible computer readable media (or computer readable storage media) and accessible by programmable devices, such as mobile devices, laptop or desktop computers, smart phones, and/or other computing devices. In some embodiments, data at autonomous vehicle application manager 560 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of autonomous vehicle application manager 560 can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of autonomous vehicle application manager 560. In one embodiment, the various functionalities of autonomous vehicle application manager 560 can be distributed among one or more of computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with autonomous vehicle application manager 560 can be distributed across computing devices 700a, 700b, and 700c based at least in part on the processing requirements of autonomous vehicle application manager 560, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of autonomous vehicle application manager 560 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of one or more autonomous vehicle application managers 560, while other cluster storage arrays can store data of other autonomous vehicle application manager(s) 560. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 238. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A control system for an autonomous vehicle, the control system comprising:
   a processor; and
   a non-transitory computer readable medium having stored thereon instructions that, when executed by the processor, cause the control system to perform operations comprising:
      controlling, by the control system, driving of the autonomous vehicle without human interaction in an autonomous mode;
      determining a status of the autonomous vehicle including a location of the autonomous vehicle;
      determining occupancy of one or more current passengers of the autonomous vehicle;
      determining a possible destination for the autonomous vehicle based on passenger information associated with the one or more current passengers of the autonomous vehicle;
      generating a hint related to the possible destination based on the status of the autonomous vehicle including the location of the autonomous vehicle;
      causing the hint to be provided through a user interface;
      receiving input related to the hint;
      based on the input, determining whether to navigate the autonomous vehicle to the possible destination; and
      after determining to navigate the autonomous vehicle to the possible destination, directing the autonomous vehicle to travel to the possible destination.

2. The control system of claim 1, wherein the status of the autonomous vehicle comprises a status of an amount of fuel for the autonomous vehicle.

3. The control system of claim 1, wherein determining the possible destination of the autonomous vehicle comprises:
   determining one or more previous destinations of the autonomous vehicle; and
   determining the possible destination based on the one or more previous destinations.

4. The control system of claim 3, wherein the status of the autonomous vehicle comprises a status of the one or more current passengers of the autonomous vehicle, and wherein determining the possible destination for the autonomous vehicle comprises:
   for each previous destination of the one or more previous destinations:

determining one or more passengers associated with the previous destination, determining whether the one or more current passengers include at least one passenger of the one or more passengers associated with the previous destination, and in response to determining that the one or more current passengers include at least one passenger of the one or more passengers associated with the previous destination, adding the previous destination to a list of possible destinations; and determining the possible destination from the list of possible destinations.

5. The control system of claim 1, wherein the status of the autonomous vehicle comprises a status of the one or more current passengers of the autonomous vehicle, and wherein determining the possible destination for the autonomous vehicle comprises determining a location of a friend of a current passenger of the one or more current passengers.

6. The control system of claim 1, wherein the status of the autonomous vehicle comprises a status of the one or more current passengers of the autonomous vehicle, and wherein determining the possible destination for the autonomous vehicle comprises determining an amount of free time for a current passenger of the one or more current passengers.

7. An article of manufacture including a computer-readable storage medium having stored thereon program instructions that, upon execution by a computing device, cause the computing device to perform operations comprising:

controlling driving of the autonomous vehicle without human interaction in an autonomous mode;

determining a status of the autonomous vehicle including a location of the autonomous vehicle;

determining occupancy of one or more current passengers of the autonomous vehicle;

determining a possible destination for the autonomous vehicle based on passenger information associated with the one or more current passengers of the autonomous vehicle;

generating a hint related to the possible destination based on the status of the autonomous vehicle including the location of the autonomous vehicle;

sending the hint;

receiving input related to the hint;

based on the input, determining whether to navigate the autonomous vehicle to the possible destination; and after determining to navigate the autonomous vehicle to the possible destination, directing the autonomous vehicle to travel to the possible destination.

8. The article of manufacture of claim 7, wherein the status of the autonomous vehicle comprises a status of an amount of fuel for the autonomous vehicle.

9. The article of manufacture of claim 7, wherein determining the possible destination of the autonomous vehicle comprises:

determining one or more previous destinations of the autonomous vehicle; and determining the possible destination based on the one or more previous destinations.

10. The article of manufacture of claim 9, wherein the status of the autonomous vehicle comprises a status of the one or more current passengers of the autonomous vehicle, and wherein determining the possible destination for the autonomous vehicle comprises:

for each previous destination of the one or more previous destinations:

determining one or more passengers associated with the previous destination, determining whether the one or more current passengers include at least one passenger of the one or more passengers associated with the previous destination, and in response to determining that the one or more current passengers include at least one passenger of the one or more passengers associated with the previous destination, adding the previous destination to a list of possible destinations; and determining the possible destination from the list of possible destinations.

11. The article of manufacture of claim 7, wherein the status of the autonomous vehicle comprises a status of the one or more current passengers of the autonomous vehicle, and wherein determining the possible destination for the autonomous vehicle comprises determining a location of a friend of a current passenger of the one or more current passengers.

12. The article of manufacture of claim 7, wherein the status of the autonomous vehicle comprises a status of the one or more current passengers of the autonomous vehicle, and wherein determining the possible destination for the autonomous vehicle comprises determining an amount of free time for a current passenger of the one or more current passengers.

13. A method, comprising:

controlling, by the control system, driving of an autonomous vehicle without human interaction in an autonomous mode;

determining a status of the autonomous vehicle including a location of the autonomous vehicle;

determining occupancy of one or more current passengers of the autonomous vehicle using an autonomous vehicle application manager;

determining a possible destination for the autonomous vehicle based on passenger information associated with the one or more current passengers of the autonomous vehicle using the autonomous vehicle application manager;

generating a hint related to the possible destination based on the status of the autonomous vehicle including the location of the autonomous vehicle using the autonomous vehicle application manager;

providing the hint using the autonomous vehicle application manager;

receiving input related to the hint at the autonomous vehicle application manager;

based on the input, the autonomous vehicle application manager determining whether to navigate the autonomous vehicle to the possible destination; and after determining to navigate the autonomous vehicle to the possible destination, the autonomous vehicle application manager directing the autonomous vehicle to travel to the possible destination.

14. The method of claim 13, wherein the status of the autonomous vehicle comprises a status of an amount of fuel for the autonomous vehicle.

15. The method of claim 13, wherein determining the possible destination of the autonomous vehicle comprises:

determining one or more previous destinations of the autonomous vehicle; and determining the possible destination based on the one or more previous destinations.

16. The method of claim 15, wherein the status of the autonomous vehicle comprises a status of the one or more current passengers of the autonomous vehicle, and wherein determining the possible destination for the autonomous vehicle comprises:

for each previous destination of the one or more previous destinations:

determining one or more passengers associated with the previous destination, determining whether the one or more current passengers include at least one passenger of the one or more passengers associated with the previous destination, and in response to determining that the one or more current passengers include at least one passenger of the one or more passengers associated with the previous destination, adding the previous destination to a list of possible destinations; and determining the possible destination from the list of possible destinations.

17. The method of claim 13, wherein the status of the autonomous vehicle comprises a status of the one or more current passengers of the autonomous vehicle, and wherein determining the possible destination for the autonomous vehicle comprises determining a location of a friend of a current passenger of the one or more current passengers.

18. The method of claim 13, wherein the status of the autonomous vehicle comprises a status of the one or more current passengers of the autonomous vehicle, and wherein determining the possible destination for the autonomous vehicle comprises determining an amount of free time for a current passenger of the one or more current passengers.

19. The control system of claim 1, wherein the operations further comprise:

requesting authorization, from the one or more current passengers of the autonomous vehicle, to examine passenger information about the one or more current passengers of the autonomous vehicle;

receiving authorization to examine the passenger information; and accessing the passenger information of the one or more current passengers of the autonomous vehicle.

20. The article of manufacture of claim 7, wherein generating a hint related to the one or more previous destinations based on the status of the autonomous vehicle including the location of the autonomous vehicle further comprises generating a hint based on a duration of time associated with a current trip of the autonomous vehicle and a current time.

21. The method of claim 13, wherein generating a hint related to the one or more previous destinations based on the status of the autonomous vehicle including the location of the autonomous vehicle further comprises generating a hint based on a duration of time associated with a current trip of the autonomous vehicle and a current time.

* * * * *